United States Patent
Chen et al.

(10) Patent No.: US 9,387,658 B2
(45) Date of Patent: Jul. 12, 2016

(54) METHOD OF THREE-DIMENSIONAL PRINTING

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 117 days.

(21) Appl. No.: 14/267,913

(22) Filed: May 2, 2014

(65) Prior Publication Data

US 2015/0239174 A1   Aug. 27, 2015

(30) Foreign Application Priority Data

Feb. 27, 2014   (TW) .............................. 103106813 A

(51) Int. Cl.
| | |
|---|---|
| *B29C 67/00* | (2006.01) |
| *B33Y 10/00* | (2015.01) |
| *B29K 91/00* | (2006.01) |
| *B29L 9/00* | (2006.01) |
| *B29L 31/00* | (2006.01) |

(52) U.S. Cl.
CPC ............. *B33Y 10/00* (2014.12); *B29C 67/0062* (2013.01); *B29K 2091/00* (2013.01); *B29L 2009/00* (2013.01); *B29L 2031/7502* (2013.01)

(58) Field of Classification Search
CPC ........................ B29C 67/0055; B29C 67/0062
USPC ........ 264/40.1, 113, 128, 130, 163, 219, 246, 264/308, 317, 401, 496, 221; 425/174, 425/174.4, 375
See application file for complete search history.

(56) References Cited

U.S. PATENT DOCUMENTS 5,833,914 A * 11/1998 Kawaguchi ......... B29C 67/0055
                                                          264/308
6,799,959 B1 * 10/2004 Tochimoto .......... B29C 67/0081
                                                          425/375

* cited by examiner

*Primary Examiner* — Joseph S Del Sole
*Assistant Examiner* — Thukhanh T Nguyen
(74) *Attorney, Agent, or Firm* — Jianq Chyun IP Office

(57) ABSTRACT

A method of three-dimensional printing of the disclosure is used to form a three-dimensional object stacked by a plurality of layers of object unit. The method of three-dimensional printing includes: forming and curing a layer of uncolored body; forming a color layer at the contour of the layer of uncolored body so that the layer of uncolored body and the color layer form a layer of object unit; and forming a cover layer at the contour of the layer of object unit so that the color layer is located between the layer of uncolored body and the cover layer.

11 Claims, 5 Drawing Sheets

METHOD OF THREE-DIMENSIONAL PRINTING

CROSS-REFERENCE TO RELATED APPLICATION

This application claims the priority benefit of Taiwan application serial no. 103106813, filed on Feb. 27, 2014. The entirety of the above-mentioned patent application is hereby incorporated by reference herein and made a part of this specification.

BACKGROUND

1. Technical Field

The technical filed generally relates to a printing method, and more particularly, to a method of three-dimensional printing.

2. Description of Related Art

Along with the progress of computer-aided manufacturing (CAM), manufacturing industry developed a technology of three-dimensional printing, by which an initial design idea can be quickly implemented. In fact, the technology of three-dimensional printing is a general designation of a series of rapid prototyping (RP) technologies, which is based on a process of stacked layers and uses an RP machine to form the cross-sections of a work-piece through scanning in an X-Y plane meanwhile makes moving for a layer thickness step-by-step along the Z coordinate so as to finally finish a three-dimensional object. The technology of three-dimensional printing has no limitation of geometric shape of the object. The more complex a work-piece is, the more excellence the rapid prototyping (RP) presents, which can largely save labour and processing time, even under a demand of the shortest deadline time, it can truly implement a digital three-dimensional model information designed according to a computer-aided design (CAD). The implemented model after the three-dimensional printing is not only touched, but also truly felt for its geometric curve, even can be tested for its assembling performance and its possessive function.

Many ways to form a plurality of thin layers of cross-section have been developed today. For example, a printing head can move along the X-Y coordinate axes over a platform according to the X-Y-Z coordinates established from the three-dimensional model design information, so that a base material is spread to form correct figures of cross-sectional layers. The deposited material later can be natural-hardened or cured by a strong light source to produce the desired cross-sectional layers. When the aforementioned curing process is performed layer by layer, the desired three-dimensional object is finished.

However, according to the prior art, when a colourful three-dimensional object is to be produced, either a colouring process is conducted after finishing the three-dimensional object, or the base material must possesses the desired colour, which increases the difficulties of selecting material and fabrication. In this regard, how to lighten the aforementioned problem has become an issue for the related technicians to consider.

SUMMARY

Accordingly, the disclosure is directed to a method of three-dimensional printing for forming a plurality of layers of object unit and a plurality of color layers at the contours of the layers of uncolored body layer by layer and using a plurality of cover layers to protect, which can increase the fabrication efficiency of a colourful three-dimensional object and reduce the process difficulty and the cost.

A method of three-dimensional printing of the disclosure is used to form a three-dimensional object stacked by a plurality of layers of object unit. The method of three-dimensional printing includes: forming and curing a layer of uncolored body; forming a color layer at the contour of the layer of uncolored body so that the layer of uncolored body and the color layer form a layer of object unit; and forming a cover layer at the contour of the layer of object unit so that the color layer is located between the layer of uncolored body and the cover layer.

A method of three-dimensional printing of the disclosure is used to form a three-dimensional object stacked by a plurality of layers of object unit. The method of three-dimensional printing includes: forming and curing a layer of uncolored body; disposing an uncured color layer and an uncured cover layer at contour of the layer of uncolored body; and curing the color layer and the cover layer, wherein the color layer after curing is adhered to the layer of uncolored body to form the layer of object unit.

Based on the depiction above, in the aforementioned embodiments, according to the method of three-dimensional printing, a color layer and a cover layer are respectively correspondingly disposed at the contour of the layer of uncolored body under the condition of stacking a plurality of thin layers of cross-section layer by layer so that the color layers are disposed between the layers of uncolored body and the cover layers. Thus, with the sequential stacking, in the following process of disposing the color layers, the disposed color layer does not contaminate the last layer of uncolored body and color layer. In this way, three-dimensional object can be colored during the formation process. That is, a same printing mode can finish the three-dimensional object and color the object as well, which can effectively increase the fabrication efficiency. Meanwhile, the color layer is disposed at the contour of the layer of uncolored body only so as to avoid the limitation of the required color a base material possesses which can increase the universality of the method of three-dimensional printing.

In order to make the features and advantages of the present disclosure more comprehensible, the present disclosure is further described in detail in the following with reference to the embodiments and the accompanying drawings.

DESCRIPTION OF THE EMBODIMENTS

Figure 1:
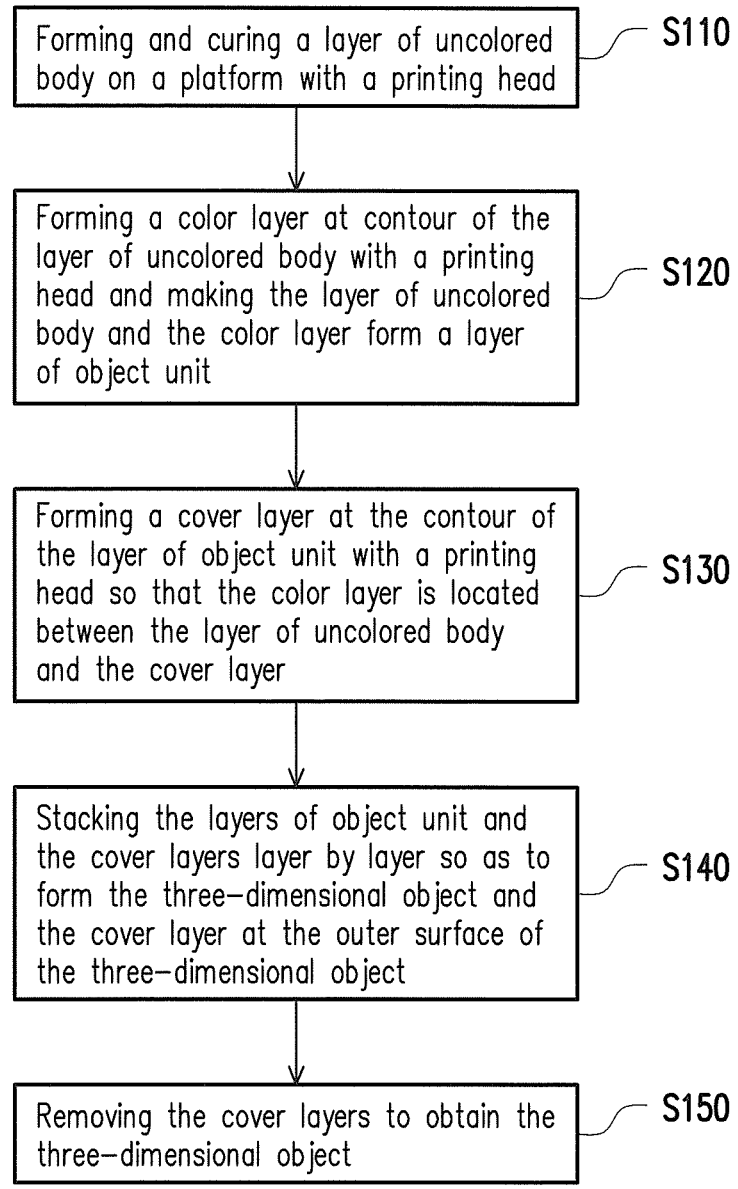
FIG. 1 is a schematic flowchart of the method of three-dimensional printing according to an embodiment.
Figure 2:
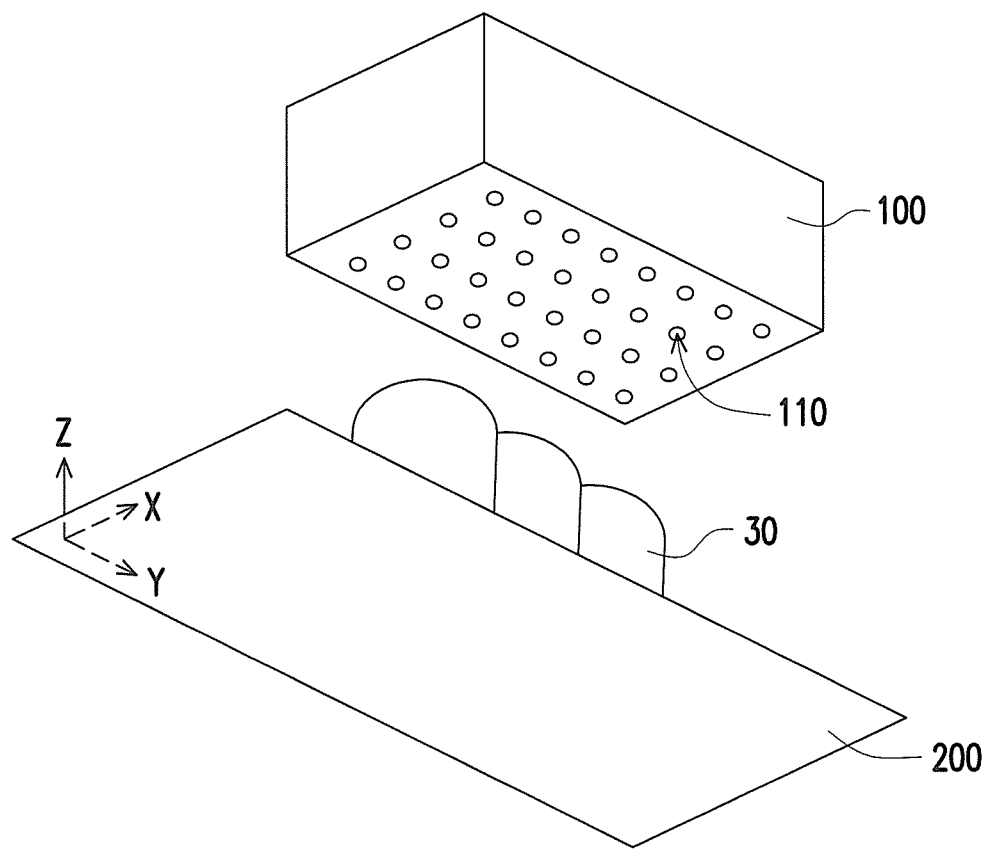
FIG. 2 illustrates the three-dimensional printing according to an embodiment.
Figure 3:
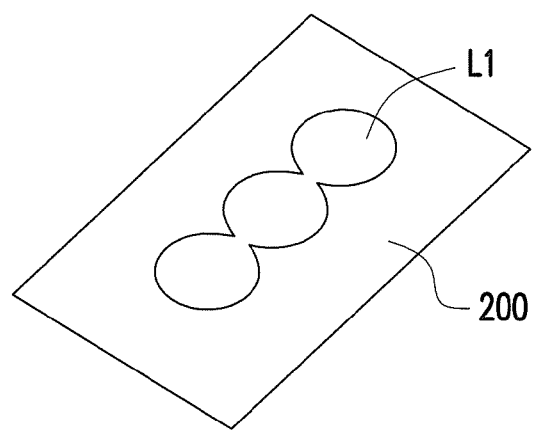
FIGS. 3-5 show the formation course of a three-dimensional object.
Figure 4:
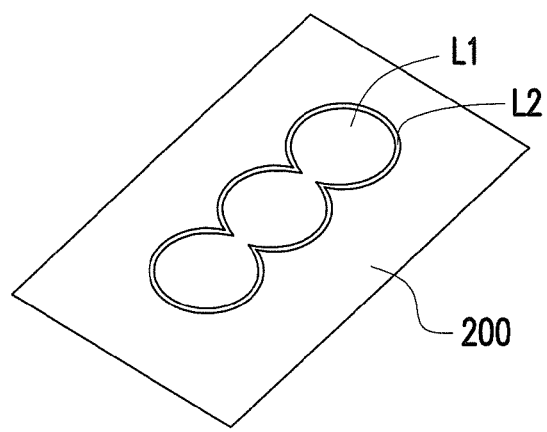
Figure 5:
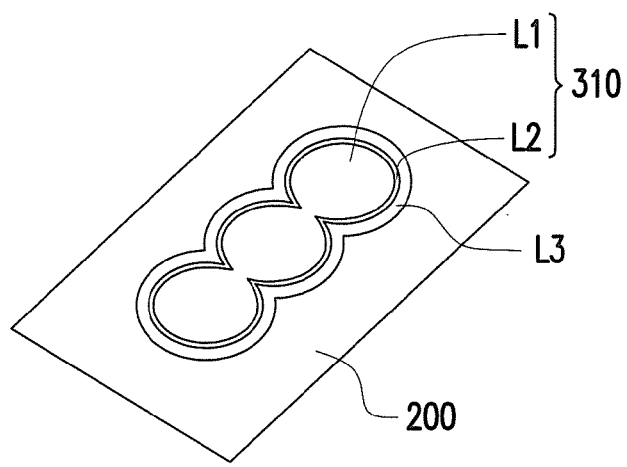

FIG. 1 is a schematic flowchart of the method of three-dimensional printing according to an embodiment, FIG. 2 illustrates the three-dimensional printing according to an embodiment, and FIGS. 3-5 show the formation course of a three-dimensional object corresponding to the major steps of FIG. 1. Referring to FIGS. 1-3, in the embodiment, by using a base material to spread out for forming cross-sections of layers, a three-dimensional object 30 is formed by stacking a plurality of layers of object unit 310. In step S110, a printing head 100 forms and cures a layer of uncolored body L1 on a platform 200. In more details, the printing head 100 moves along the X-Y coordinate axes over the platform 200 according to the X-Y-Z coordinates established by the design data of a 3-D model so as to spread out the base material in liquid or slurry state on the platform 200 to form a right cross-section of layer, followed by curing the layer into an aforementioned layer of uncolored body L1. The deposited based material can be a photosensitive resin in liquid or slurry state so as to facilitate subsequent natural-hardening or curing through a specific light source and then form the layer with desired cross-section.

Next in step S120, the printing head 100 is used again to form a color layer L2 at the contour of the layer of uncolored body L1 so as to make the outer surface of the layer of uncolored body L1 have a desired color. As shown by FIGS. 3-4, the three-dimensional object 30 is composed of a plurality of extreme-thin layers of cross-section. Therefore, the process of disposing the color layer L2 herein is the same as forming the layer of uncolored body L1 before. The printing head 100 conducts spreading process in two-dimensional space, i.e., in the printing way of the embodiment, the layer of uncolored body L1 and the color layer L2 on the platform 200 are formed in printing mode (the printing head 100 moves along the X-Y coordinate axes and spreads to form the desired layer of uncolored body L1 and the color layer L2). Accordingly, the designer needs to connect the required base material and pigment and communicate them with the printing head 100, and then, the nuzzles 110 arranged in array on the printing head 100 can perform the spreading process of a layer of uncolored body L1, followed by immediately performing the coloring process on the contour of the layer of uncolored body L1 so as to form a layers of object unit 310 composed of the layers of uncolored body L1 and the color layers L2.

Then in step S130, after the color layer L2 is completed and formed, the printing head 100 further forms a cover layer L3 at the contour of the layer of object unit 310, in which the material of the cover layer L3 is, for example, wax, and the color layer L2 is located between the layer of uncolored body L1 and the cover layer L3. That is, in the step, the cover layer L3 on the two-dimensional plane where the platform 200 is located at entirely clads the layer of uncolored body L1 and the color layer L2. The cover layer L3 can be seen finished on the two-dimensional space together with the layer of uncolored body L1 and the color layer L2. Therefore, in terms of the printing head, it prints the cover layer L3 in printing mode as well.

In the embodiment, the material of the layer of uncolored body L1 and the material of the color layer L2 are attractive to each other therebetween and the material of the cover layer L3 and the material of the color layer L2 are rejected from each other therebetween. Accordingly, the color layer L2 and the layer of uncolored body L1 can be easily bounded due to the attractability. On contrary, although the cover layer L3 directly contacts the contour of the color layer L2, but the material of the cover layer L3 and the material of the color layer L2 are rejected from each other so as to keep a separation state between the color layer L2 and the cover layer L3. The disclosure does not limit the material types of the layer of uncolored body L1, the color layer L2 and the cover layer L3, and the designer can select an appropriate material depending on the need and the above-mentioned attractability and rejection. For example, the designer can select a proper material combination for the layer of uncolored body L1, the color layer L2 and the cover layer L3 according to the chemical bond and its bonding force extent.

Figure 6:
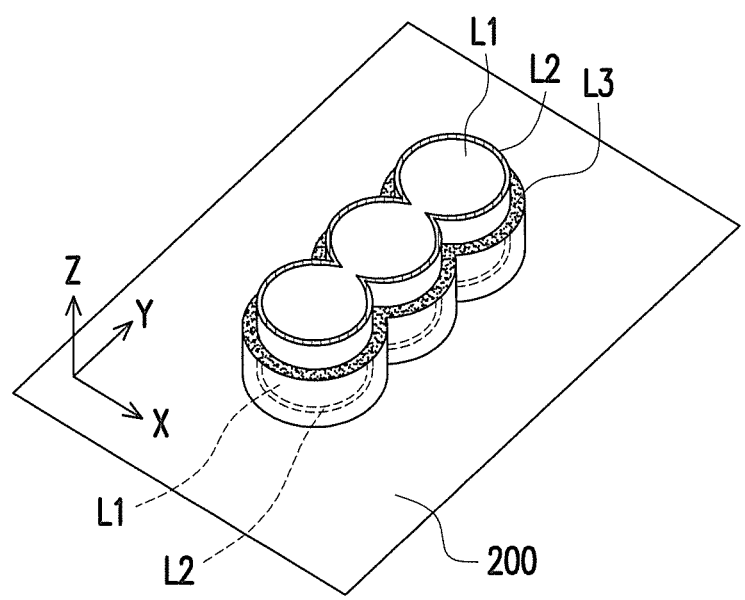
FIG. 6 is a partial diagram of a three-dimensional object.

Then in step S140, after sequentially finishing the layer of uncolored body L1, the color layer L2 and the cover layer L3, i.e., after finishing a layer of object unit 310 and disposing a cover layer L3 at the contour thereof, the next fabrication operation of the second layer of object unit 310 and cover layer L3 is conducted. At the time, the platform 200 moves along the Z axis or the printing head 100 is driven to move along the Z axis so as to stack every layer of object unit 310 and every cover layer L3 layer by layer to further finish the three-dimensional object 30 with the cover layers L3 at the outer surface of the object. FIG. 6 is a partial diagram of a three-dimensional object, wherein for better identifying the feature of every layer, the thicknesses along the Z axis are different-size treated where only the last cover layer is shown, but the next cover layer is omitted. It should be noted that as shown by FIG. 6, when conducting the spreading of the next layer, the same as steps S110 and S120, the layer of uncolored body L1 and the color layer L2 are formed, but during the operation of forming the color layer L2, since both the last layer of uncolored body L1 and color layer L2 (as shown by the dotted line in FIG. 6) are cladded by the cover layer L3 already, so that the pigment of the next color layer L2 only affects the cover layer L3 thereunder, which makes the cover layer L3 enable to protect the layer of uncolored body L1 and color layer L2 therein and it can avoid the interfere for subsequent spreading the color layer L2. By means of the cover layer L3, the embodiment can avoid different color layers L2 from getting blending or dyeing therebetween.

At last, when finishing the stacked layers of object unit 310 and cover layers L3, the three-dimensional object 30 with cover layers L3 at the outer surface of the object is finished. In step S150, the outer cover layers L3 are removed so as to obtain the desired three-dimensional object 30 with colors. The disclosure does not limit the way of removing the cover layers L3. The designer can select an appropriate removing agent to remove the cover layers L3 without affecting the cladded three-dimensional object 30 and the surface color layers L2 according to the attractive or rejection feature of the materials between the layer of uncolored body L1, the color layer L2 and the cover layer L3.

Figure 7:
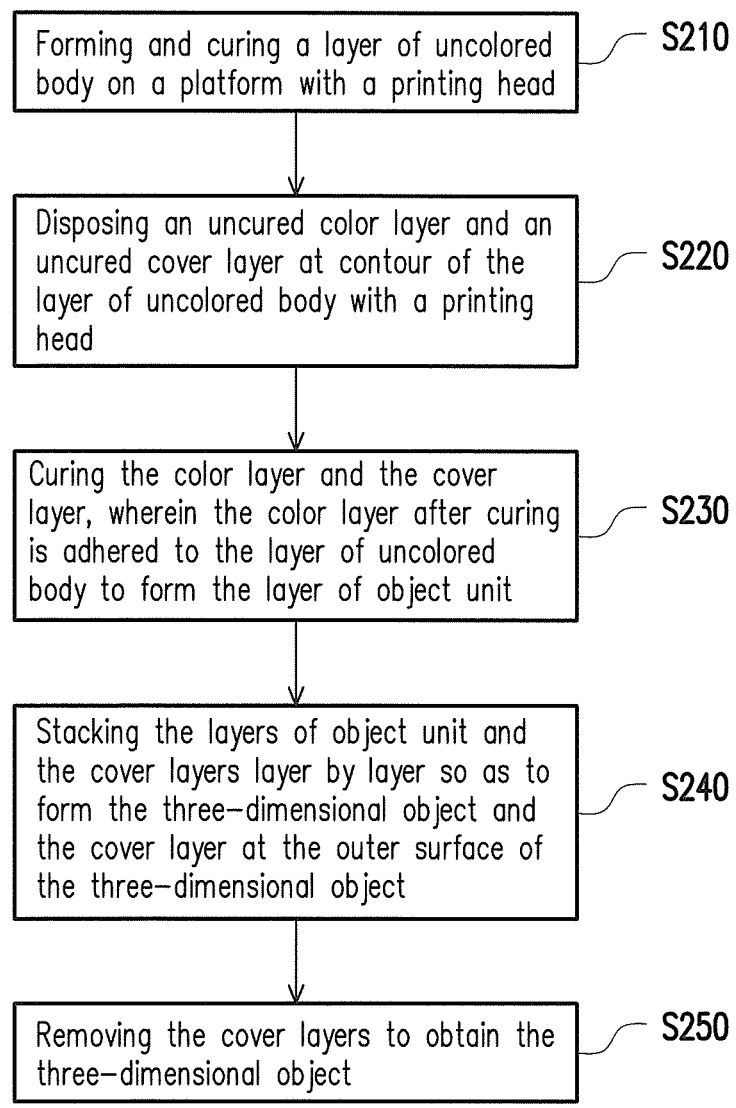
FIG. 7 is a schematic flowchart of the method of three-dimensional printing according to another embodiment.

FIG. 7 is a schematic flowchart of the method of three-dimensional printing according to another embodiment. Referring to FIG. 7, in the embodiment, step S120 and step S130 are combined conducted, i.e., the color layer L2 in the embodiment selects a color resin. In step S210, the same as step S110, the layer of uncolored body L1 is formed and cured. Next in step S220, an uncured color layer L2 (in liquid or slurry state) and an uncured cover layer L3 are disposed at the contour of the layer of uncolored body L1, wherein the color layer L2 is located between the layer of uncolored body L1 and the cover layer L3 and, through the material attractability, is adhered onto the layer of uncolored body L1, while the uncured color layer L2 and the uncured cover layer L3, due to the material rejection feature, still remain the separation state. Then in step S230, the color layer L2 and the cover layer L3 are cured, so that the cured color layer L2 can be adhered to the layer of uncolored body L1 and together with the layer of uncolored body L1 form a layer of object unit 310 to achieve the same effect of the aforementioned embodiment. Then the same as step S140 and step S150, in step S240 and step S250 of the embodiment, the layers of object unit 310 and the cover layers L3 are stacked layer by layer to form the three-dimensional object 30 and the cover layers L3 on the outer surface of the three-dimensional object 30. Finally, the cover layers L3 are removed to obtain the naked three-dimensional object 30 and achieve the same effect of the aforementioned embodiment.

In summary, in the aforementioned embodiments, according to the printing method of three-dimensional, the layers of object unit and the color layer thereon are together formed by using a two-dimensional spreading process, i.e., after finishing a layer of uncolored body, a color layer is formed at the contour of the layer of uncolored body and meanwhile the color layer is cladded by a cover layer, so that during the subsequent operation of stacking the layer of uncolored body and the color layer, the cover layer can avoid the adjacent two color layers from interference therebetween. Thus, the three-dimensional printing device can use the same printing mode to finish the desired three-dimensional object and to color the object, which can effectively reduce the fabrication time of the three-dimensional object, lighten the limitation of base material due to the color thereof, reduce the fabrication cost and increase the adaption of the method of three-dimensional printing.

Moreover, the disclosure uses the attractability and the rejection between the materials of the layer of uncolored body, the color layer and the cover layer so that the color layer can effectively adhere onto the layer of uncolored body, meanwhile the cover layer can contact the color layer but exclude the problem of residue on the color layer. As a result, the cover layer cladding the formed three-dimensional object can be easily removed so as to further advance the fabrication efficiency and quality of the three-dimensional object.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A method of three-dimensional printing, used to form a three-dimensional object stacked by a plurality of layers of object unit and comprising:
    forming and curing a layer of uncolored body;
    forming a color layer at contour of the layer of uncolored body after the layer of uncolored body is finished so that the layer of uncolored body and the color layer form a layer of object unit; and
    forming a cover layer at the contour of the layer of object unit so that the color layer is located between the layer of uncolored body and the cover layer.

2. The method of three-dimensional printing as claimed in claim 1, wherein the material of the layer of uncolored body and the material of the color layer are attractive to each other therebetween and the material of the cover layer and the material of the color layer is rejected from each other therebetween.

3. The method of three-dimensional printing as claimed in claim 1, further comprising:
    sequentially forming the layer of uncolored body, the color layer and the cover layer, wherein the layers are sequentially stacked with each other.

4. The method of three-dimensional printing as claimed in claim 1, further comprising:
    after forming the stacked layers of object unit and cover layers, removing the cover layers to form the three-dimensional object.

5. The method of three-dimensional printing as claimed in claim 1, wherein the material of the layer of uncolored body comprises resin.

6. The method of three-dimensional printing as claimed in claim 1, wherein the material of the cover layer comprises wax.

7. A method of three-dimensional printing, used to form a three-dimensional object stacked by a plurality of layers of object unit and comprising:
    forming and curing a layer of uncolored body;
    disposing an uncured color layer and an uncured cover layer at contour of the layer of uncolored body; and
    curing the color layer and the cover layer, wherein the color layer after curing is adhered to the layer of uncolored body to form the layer of object unit.

8. The method of three-dimensional printing as claimed in claim 7, wherein the material of the layer of uncolored body and the material of the color layer are attractive to each other therebetween and the material of the uncured cover layer and the uncured color layer are rejected from each other therebetween.

9. The method of three-dimensional printing as claimed in claim 7, further comprising:
    after forming the stacked layers of object unit and cover layers, removing the cover layers to form the three-dimensional object.

10. The method of three-dimensional printing as claimed in claim 7, wherein the material of the layer of uncolored body comprises resin.

11. The method of three-dimensional printing as claimed in claim 7, wherein the material of the cover layer comprises wax.

* * * * *